No. 892,407. PATENTED JULY 7, 1908.
J. N. & W. T. COURTNEY.
COMBINED HAT, COAT, AND UMBRELLA RACK.
APPLICATION FILED JAN. 24, 1908.
2 SHEETS—SHEET 1.
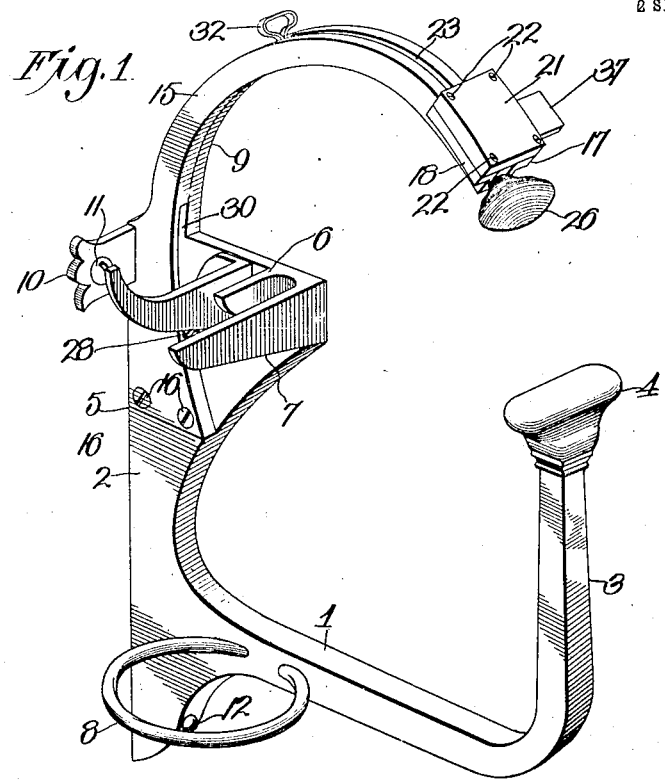
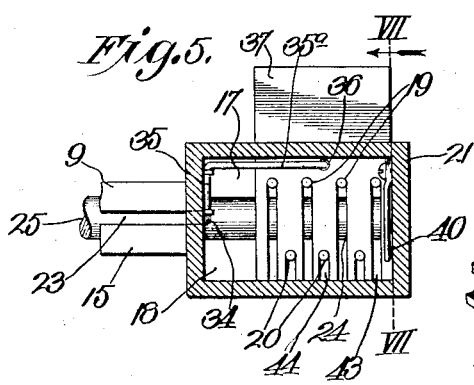
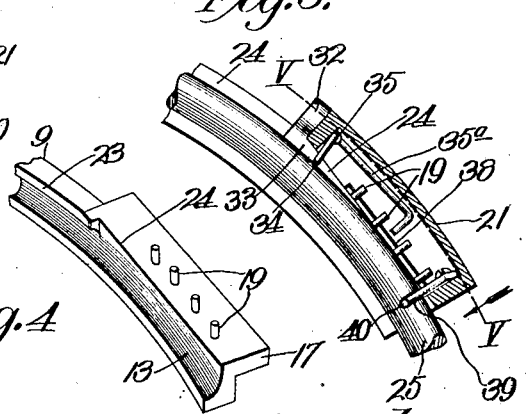
Witnesses:
Frank R. Glore
H. C. Rodgers
Inventors:
J. N. Courtney
and W. T. Courtney
By George J. Hoope Atty No. 892,407. PATENTED JULY 7, 1908.
J. N. & W. T. COURTNEY.
COMBINED HAT, COAT, AND UMBRELLA RACK.
APPLICATION FILED JAN. 24, 1908.
2 SHEETS—SHEET 2.
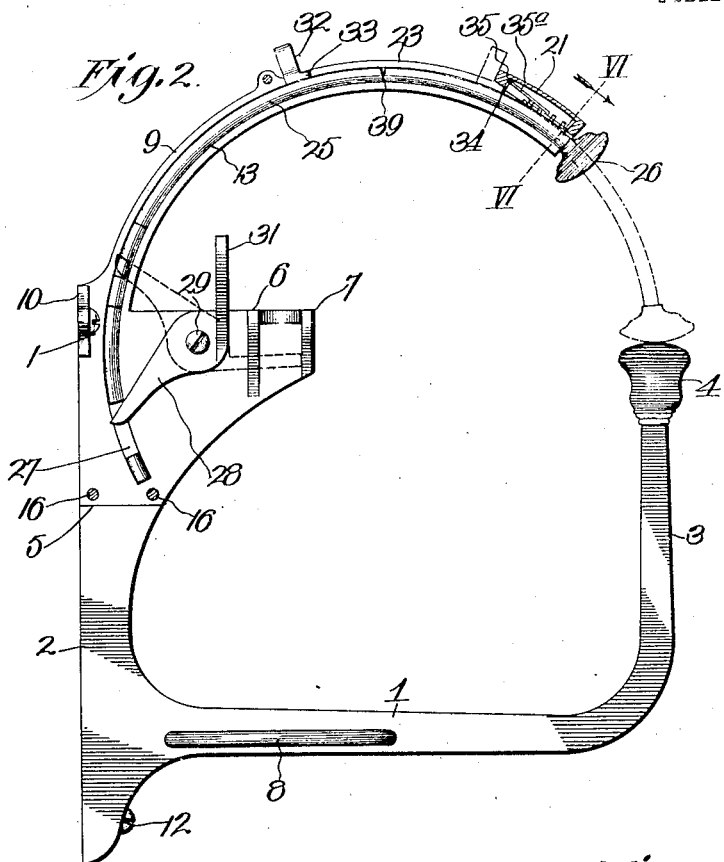
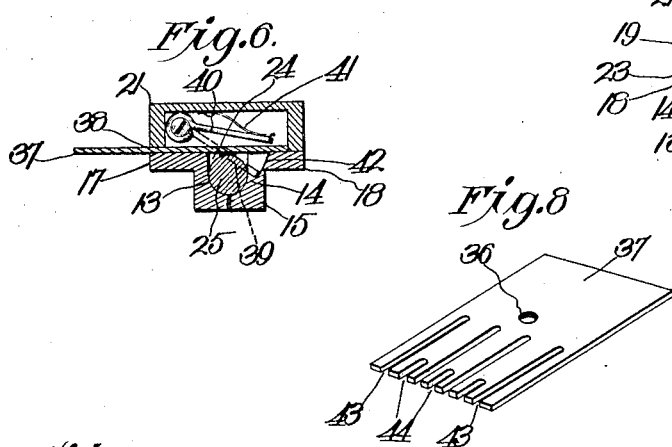
Witnesses:
Frank R. Glore
H. C. Rodgers
Inventors:
J. N. Courtney and
W. T. Courtney
By George U. Thorpe Atty.

UNITED STATES PATENT OFFICE.

JOHN N. COURTNEY AND WILLIAM T. COURTNEY, OF EXCELSIOR SPRINGS, MISSOURI.

COMBINED HAT, COAT, AND UMBRELLA RACK.

No. 892,407.　　　　　Specification of Letters Patent.　　　　Patented July 7, 1908.

Application filed January 24, 1908. Serial No. 412,369.

*To all whom it may concern:*

Be it known that we, JOHN N. COURTNEY and WILLIAM T. COURTNEY, citizens of the United States, residing at Excelsior Springs, in the county of Clay and State of Missouri, have invented certain new and useful Improvements in a Combined Hat, Coat, and Umbrella Rack, of which the following is a specification.

This invention relates to combined hat, coat, and umbrella racks and has for its object to produce a device of this character which can be closed to secure said articles or other articles in position but which cannot be opened except by one holding the proper key.

A further object is to produce a device of this character which operates efficiently and reliably, possesses the requisite strength and durability, is of ornamental appearance and of inexpensive construction.

To these ends the invention consists in certain novel and peculiar features of construction and organization as hereinafter described and claimed; and in order that it may be fully understood reference is to be had to the accompanying drawings, in which—

Figure 1, is a perspective view of a combination rack embodying our invention. Fig. 2, is a side view of the device with a part omitted and with the lock-casing in central longitudinal section. Fig. 3, is an enlarged view corresponding to a part of Fig. 2, except that the movable or clamp member is occupying its locked position. Fig. 4, is a perspective view of a portion of the arc-shaped arm forming part of the device. Fig. 5, is a section on the line V—V of Fig. 3. Fig. 6, is a cross section on the line VI—VI of Fig. 2. Fig. 7, is a cross section on the line VII—VII of Fig. 5, omitting the spring in the vertical plane of said section. Fig. 8, is a detail perspective view of the key for unlocking the clamp or movable member.

In the said drawings, the frame of the device is constructed as follows:—1 indicates a substantially horizontal bar having upwardly projecting arms 2 and 3 at its opposite ends, the arm 3 preferably terminating in an ornamental head or enlargement 4. The arm 2 in approximately the horizontal plane of head 4 is of increased width and from such plane a suitable distance downward is of diminished thickness so as to form a substantially horizontal shoulder 5. The arm 2 at its upper corner nearest head 4 is provided with the laterally projecting arms 6 and 7 of unequal length, the arm 7 being nearest head 4 and substantially parallel with arm 6, the space between the arms being in the vertical plane of a horizontal stay ring secured to base 1 for a purpose which hereinafter appears.

Projecting from the upper corner of arm 2 at the opposite side of arms 6 and 7 from head 4 is an arc-shaped arm 9, said arm lying in the vertical plane of base 1 and terminating in a plane above head 4 and of such curvature that if continued it would meet said head.

10 indicates a pair of ears projecting in opposite directions from arm 2 at the base of arm 9 through which screws 11 are adapted to extend, a screw 12 extending through the lower end of arm 2 into the wall to coöperate with screws 11 in holding the bracket properly in place.

13 indicates a groove extending through arm 9 and down into arm 2 and forming in conjunction with the similar groove in a similarly grooved plate 15, a guideway, said plate 15 fitting at its lower end against shoulder 5 and secured in such position by screws 16. At their opposite ends arm 9 and plate 15 are provided with laterally projecting flanges 17 and 18 respectively, flange 17 being equipped with a number of outwardly projecting pins 19 and flange 18 with a number of outwardly projecting pins 20, these pins projecting into a lock-casing 21 fitting down upon said flanges and secured to the same by screws 22 or equivalent devices, it being noticed that by thus securing the lock-casing to the flanges the arm 9 and plate 15 are also rigidly secured together at their free ends.

23 indicates a slot formed in the adjacent outer edges of arm 9 and plate 15 and opening into a wider slot 24, bridged by the lock-casing, said slot 24 being preferably of the full width of the guideway formed by grooves 13 and 14 as shown most clearly in Figs. 6 and 7.

25 indicates the movable clamp rod, the same corresponding in curvature and fitting in the guideway formed by grooves 13 and 14 and provided at its front end forward of the lock-casing with an enlargement or head 26 and at its opposite end with a slot 27 receiving the end of a lever 28 pivoted at 29 to arm 2, and playing through a slot 30 formed in the inner edge of plate 15. Said lever is provided with a hook-arm 31 projecting laterally in the same direction as arms 6 and 7, said hook-arm when the lever is swung to the position shown by dotted lines Fig. 2, by the closing of the movable clamp swinging over past arm 6 against arm 7 so as to bridge the space between the outer ends of said arms and thus prevent the handle of an umbrella or equivalent device occupying said space from being drawn laterally out of it, such umbrella extending down through the ring 8 hereinbefore described in order that the latter shall prevent any swinging movement from being imparted to the umbrella whereby its handle end if in the shape of a hook, might be slipped or worked downward through and out of the space bridged or closed by said hook-arm. The movable clamp 25 is provided with a finger piece 32 projecting up through slot 23 and having a forwardly projecting tongue 33 occupying said slot and adapted when moved to the position shown in Fig. 3, to strike and operate the arm 34 of a crank shaft 35 journaled in a casing 21, said shaft having an arm 35$^a$ to normally engage an aperture 36 in the key 37 and lock said key in the casing, the latter being provided with a slot 38 for the reception of the key. It will thus be seen that as long as the clamp rod is in its closed position as shown by dotted lines Fig. 2, the lug 33 is pressing against the crank arm 34 and thus holds the key-locking arm 35$^a$ outward of aperture 36 so that said arm shall not interfere with the introduction of the key when it is desired to unlock clamp rod 25 preliminary to sliding it back to its original position.

In order to automatically lock the clamp rod in the position shown in dotted lines Fig. 2 and full lines Fig. 3, it is provided with a notch 39 into which automatically swings latch 40 pivoted in the casing and held pressed yieldingly downward therein by spring 41, the latch extending downward across the casing convergingly with respect to the front or bit end of the key. The plate 15 is provided with a notch 42 in the vertical plane of the notch 39 so that when said notches register said latch automatically swings down through notch 42 into the notch of the clamp rod and thus locks the same in position and to unlock it the key is slipped into slot 38, the said key being provided with guide slots 43 and 44 to engage guide pins 19, so as to insure a direct reciprocatory movement thereof. As the key is forced inward the alined end of the bit engages and forces latch 40 upward to the position shown in Fig. 6 and as the key movement is arrested by engagement with said guide pins or the opposite wall of the casing as shown in Fig. 5, its perforation 36 becomes alined with the end of crank arm 35$^a$ and the latter automatically engages said perforation and locks the key in position. It will thus be seen that when the device is in its normal or unlocked position the key is always in place as it cannot be removed until the clamp rod is moved to locked position and is locked in such position by the spring actuated latch 40, it being also apparent that the latter cannot be raised up out of notch 39 until the key is again introduced as hereinbefore explained.

In practice a hat and coat may be hung upon head 4 or the loop of the coat may be slipped over the head and down until it is suspended from base 1. An umbrella can also be slipped down into ring 8 and its handle slipped into the space between arms 6 and 7. The person in control can then grasp finger piece 32 or head 26 and slide the clamp rod 25 forward until it either engages the hat or coat or lies so close to the same that it cannot be withdrawn without first withdrawing the slidable clamp rod. As the rod is moved the rear end of slot 27 strikes and raises lever 28 and causes the hook arm 31 thereof to bridge the space between arms 6 and 7 as explained so as to prevent the withdrawal or removal of the umbrella or its equivalent, it being noticed that the hook end of the hook arm cannot be moved substantially below a horizontal position or back again as long as the clamp rod is locked in its advanced position, because the end of lever 28 is confined between the rear end of slot 27 and the upper end of slot 30, it being understood that when the lever 28 is in the position shown in Fig. 2 it will be in engagement with the lower end of slot 30 and hence always remains in operative relation with respect to the slidable clamp rod.

It will be apparent that other articles, for instance grips, or satchels or handbags can be secured in the device and cannot be removed by a person not equipped with the key, and that the invention is susceptible of modification in minor particulars without departing from the principle of construction involved.

Having thus described the invention, what we claim as new and desire to secure by Letters Patent, is:—

1. In a rack of the character described, a frame having a pair of laterally projecting arms, an upwardly-projecting arm and an arc-shaped arm curving downwardly and toward the upper end of the upwardly-projecting arm, an arc-shaped rod slidingly carried by the arc-shaped arm and provided with a slot, and a lever pivoted to the frame and provided with a hook-arm at one end and having its opposite end engaging said slot and adapted when said rod is slid in one direction to be engaged by one end-wall of said slot and operated until said hook-arm bridges and closes the space between said laterally projecting arms and to be engaged by the opposite end-wall of said slot and operated thereby when the said rod is slid in the opposite direction, to withdraw said hook-arm to its original position.

2. In a rack of the character described, a frame having a pair of laterally projecting arms, an upwardly-projecting arm and an arc-shaped arm curving downwardly and toward the upper end of the upwardly-projecting arm, an arc-shaped rod slidingly carried by the arc-shaped arm provided with a slot, a lever pivoted to the frame and provided with a hook-arm at one end and having its opposite end engaging said slot and adapted when said rod is slid in one direction to be engaged by one end-wall of said slot and operated until said hook-arm bridges and closes the space between said laterally projecting arms and to be engaged by the opposite end-wall of said slot and operated thereby when the said rod is slid in the opposite direction, to withdraw said hook-arm to its original position, and means to lock the slide-rod in the position it occupies when it has caused said hook-arm to bridge and close the space between said laterally projecting arms.

3. In a rack of the character described, a frame having a pair of laterally projecting arms, an upwardly-projecting arm and an arc-shaped arm curving downwardly and toward the upper end of the upwardly-projecting arm, an arc-shaped rod slidingly carried by the arc-shaped arm provided with a slot, a lever pivoted to the frame and provided with a hook-arm at one end and having its opposite end engaging said slot and adapted when said rod is slid in one direction to be engaged by one end-wall of said slot and operated until said hook arm bridges and closes the space between said laterally projecting arms and to be engaged by the opposite end-wall of said slot and operated thereby when the said rod is slid in the opposite direction, to withdraw said hook-arm to its original position, means to lock the slide-rod in the position it occupies when it has caused said hook-arm to bridge and close the space between said laterally projecting arms, a key for unlocking said locking means, and means to lock said key in place when said slide-rod and said hook-arm are withdrawn to and occupy their original positions.

4. In a rack of the character described, a frame having an upwardly projecting arm and an arc-shaped arm curving downward and toward the upper end of the first-named arm and provided with a longitudinal groove of the same curvature, a plate secured to the device at the grooved side and provided with a corresponding groove which conjointly with the first-named groove forms a guideway, a curved clamp rod fitting slidingly in said guideway and projecting beyond the front end of the same and provided with a notch, a lock-casing secured to the front end of the arm and plate secured thereto, a latch within the casing and adapted to engage the clamp rod and to automatically snap into the notch of the same when advanced to lock it in such position, a sliding key to be slid into the casing to force and hold said latch out of the notch, means for automatically engaging the key and locking it in the casing, and means movable with the clamp rod for disengaging said means from the key when the said rod is advanced its full distance to permit the key to be withdrawn.

5. In a rack of the character described, a frame having a pair of laterally projecting arms, an upwardly projecting arm and an arc-shaped arm curving downward and toward the upper end of the first-named arm and provided with a longitudinal groove of the same curvature, a plate secured to the device at the grooved side and provided with a corresponding groove which conjointly with the first-named groove forms a guideway, a curved clamp rod fitting slidingly in said guideway and projecting beyond the front end of the same and provided with a notch, and rearward of the same with a slot, a lock-casing secured to the front end of the arm and plate secured thereto, a latch within the casing and adapted to engage the clamp rod and to automatically snap into the notch of the same when advanced to lock it in such position, and a lever pivoted to the device and provided with a curved hook arm at one end and having its opposite end projecting into the guideway and the slot of the clamp rod and adapted when the latter is advanced to be operated until its hook arm bridges and closes the space between said laterally projecting arms and be reversely operated when the clamp rod is returned to its original or open position.

6. In a rack of the character described, a frame having an upwardly projecting arm and an arc-shaped arm curving downward and toward the upper end of the first-named arm and provided with a longitudinal groove of the same curvature, a plate secured to the device at the grooved side and provided with a corresponding groove which conjointly with the first-named groove forms a guideway, a curved clamp rod fitting slidingly in said guideway and projecting beyond the front end of the same and provided with a notch, and rearward of the same with a slot, a lock-casing secured to the front end of the arm and plate secured thereto, a latch within the casing and adapted to engage the clamp rod and to automatically snap into the notch of the same when advanced to lock it in such position, a pair of arms projecting laterally from the frame, a lever pivoted to the device and provided with a curved hook arm at one end and having its opposite end projecting into the guideway and the slot of the clamp rod and adapted when the latter is advanced to be operated until its hook arm bridges and closes the space between said laterally projecting arms and be reversely operated when the clamp rod is returned to its original or open position, and a ring rigid with the device below said laterally projecting arms, all arranged substantially as and for the purpose described.

In testimony whereof we affix our signatures, in the presence of two witnesses.

JOHN N. COURTNEY.
WILLIAM T. COURTNEY.

Witnesses:
A. P. CAMPBELL,
R. L. BATES.